United States Patent Office 2,826,618
Patented Mar. 11, 1958

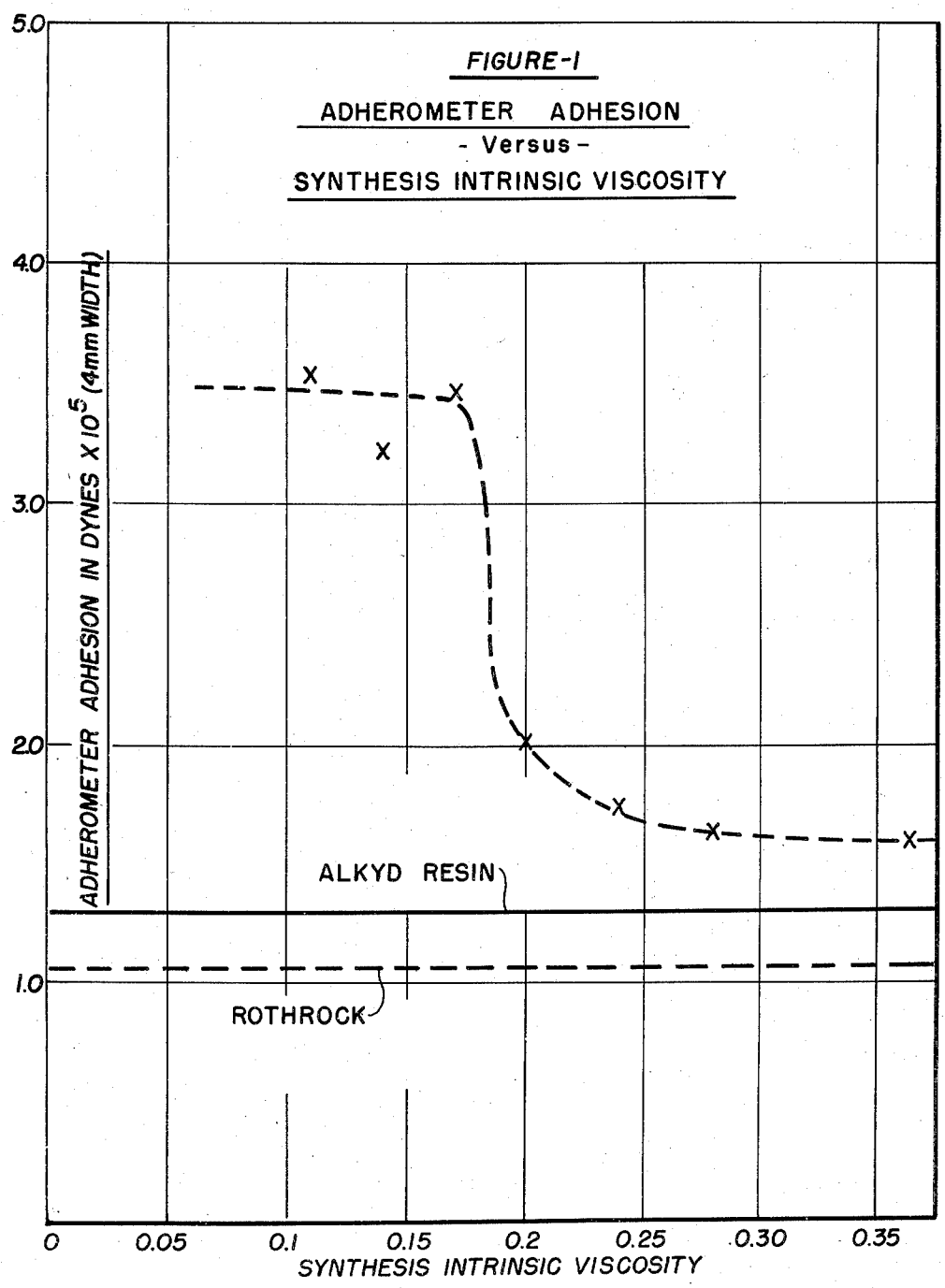

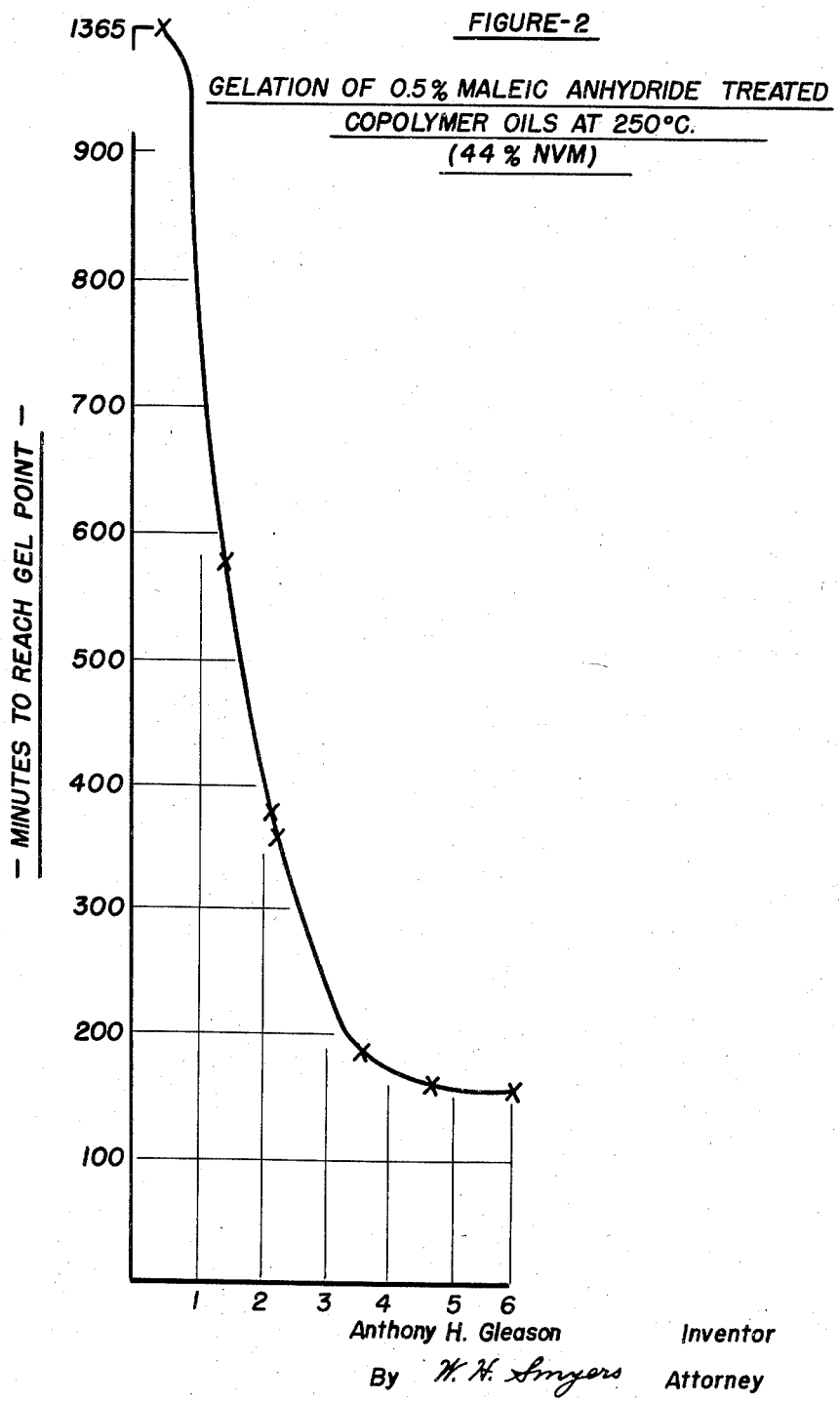

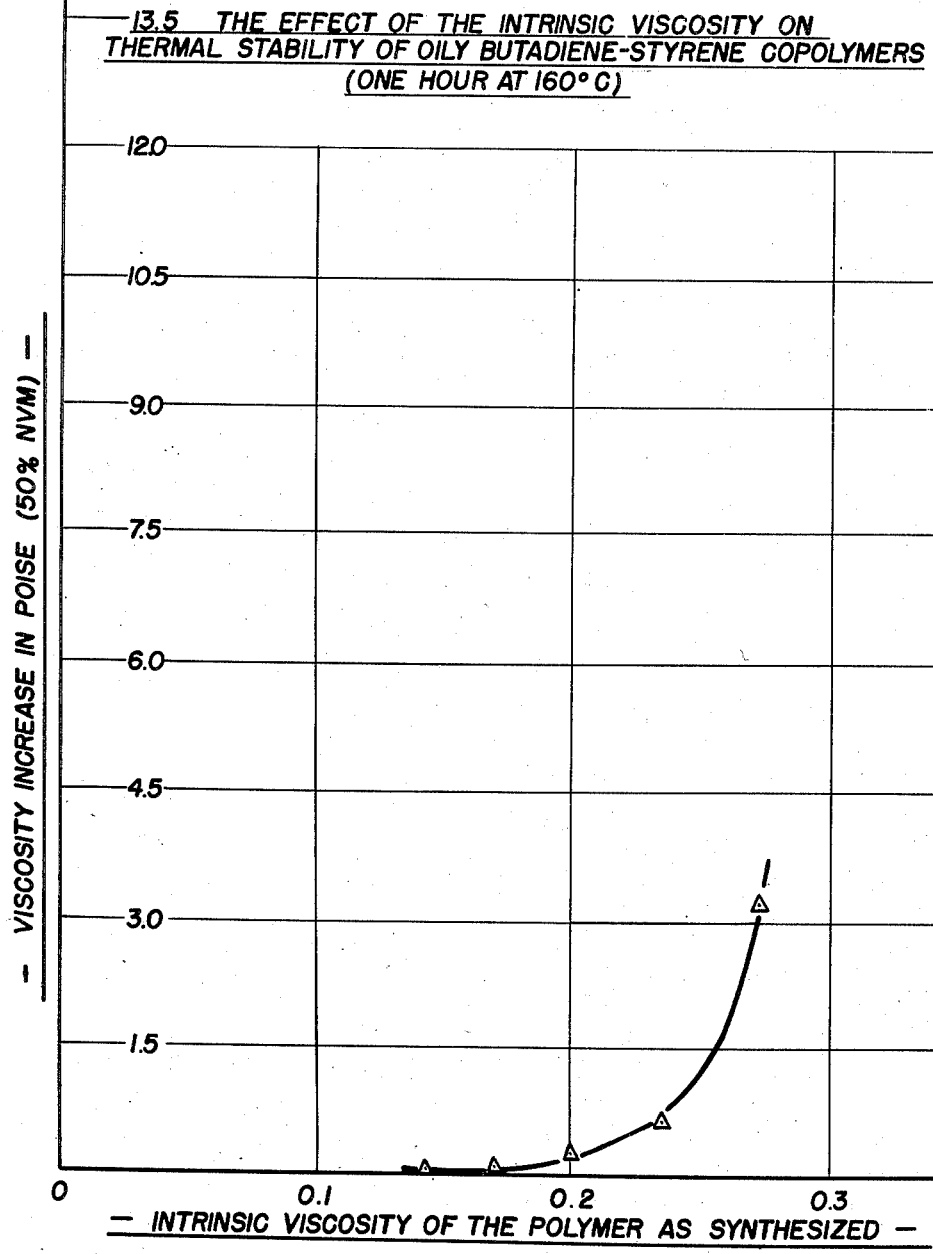

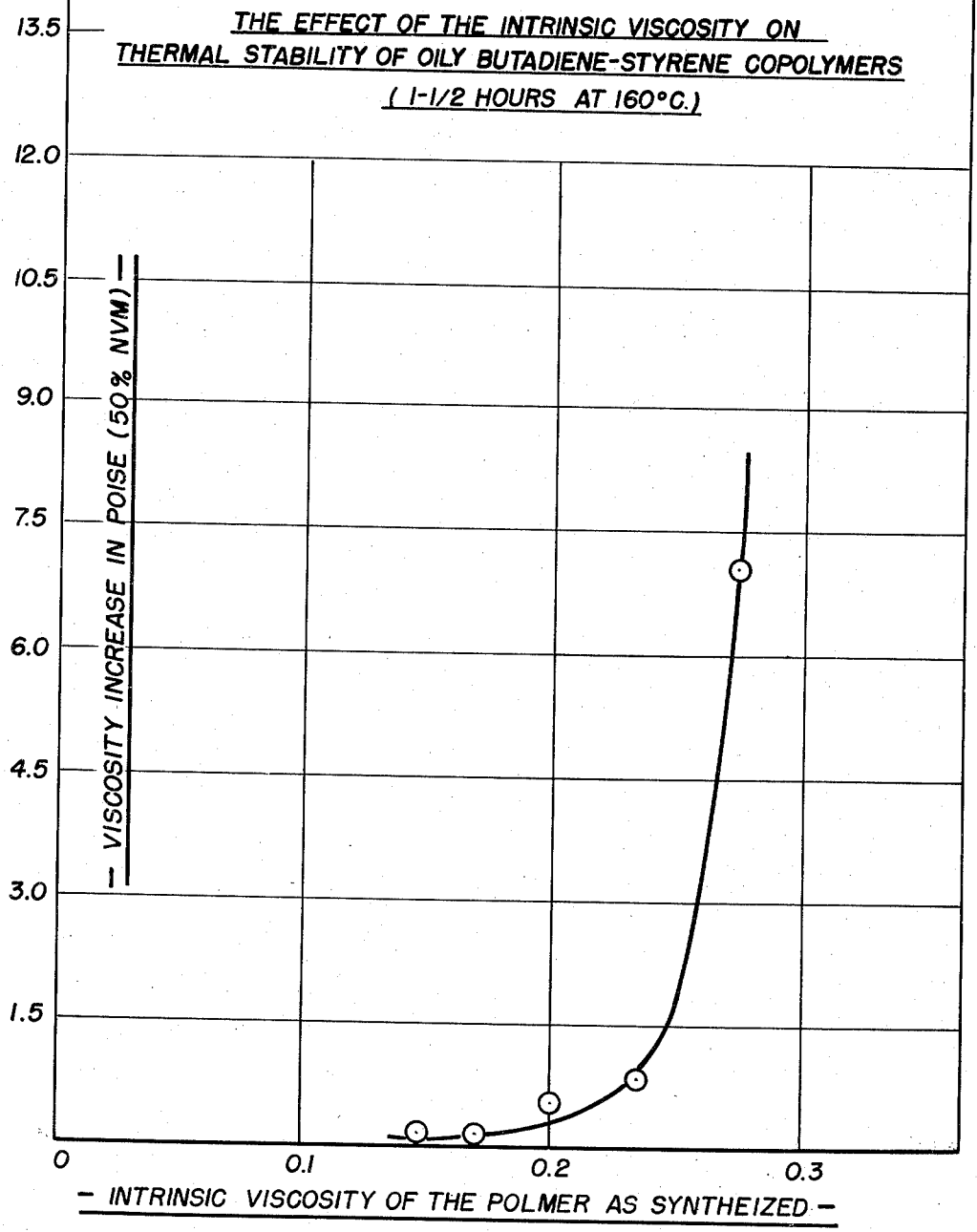

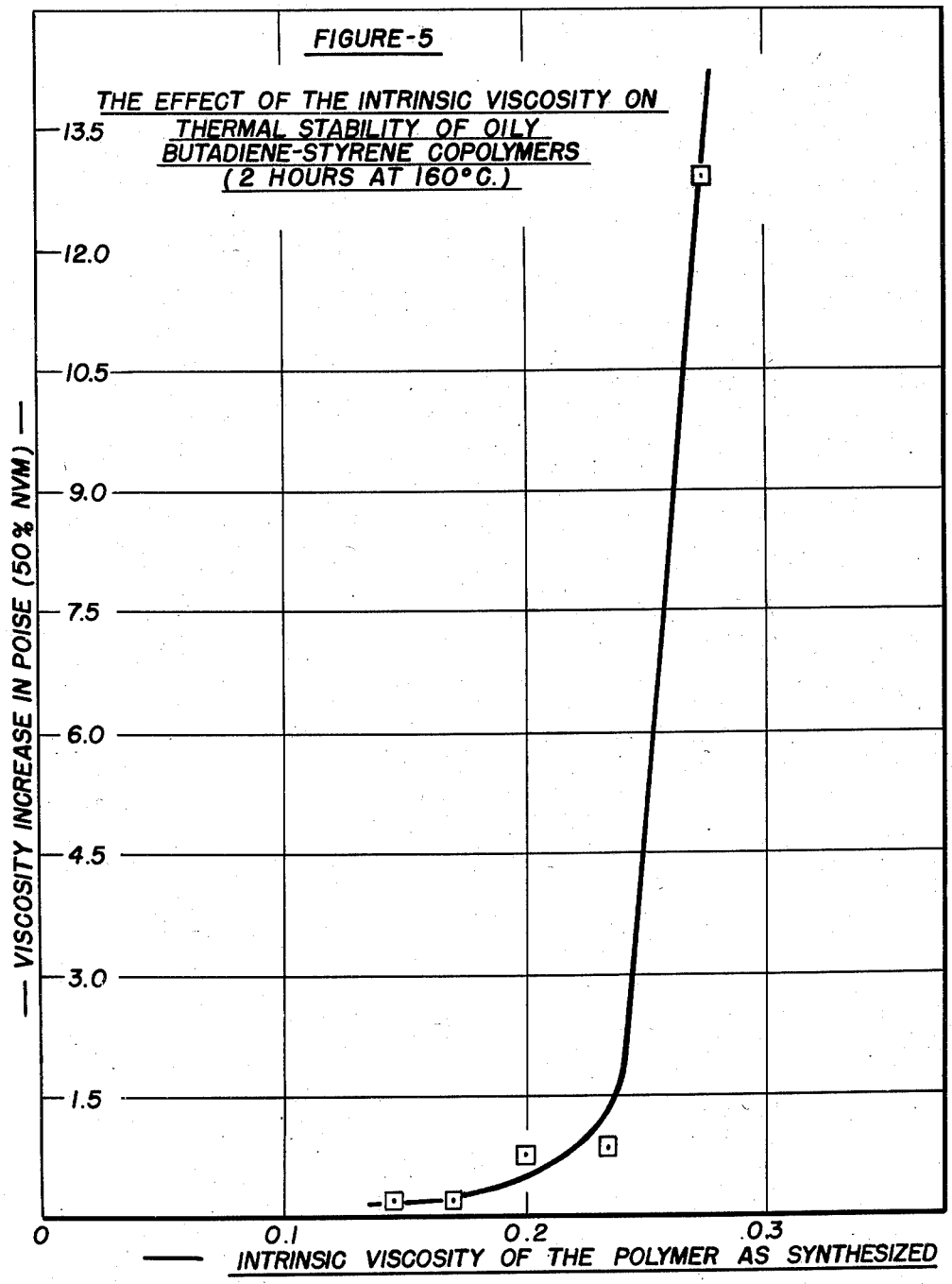

2,826,618
LOW VISCOSITY SYNTHETIC DRYING OILS

Anthony H. Gleason, Westfield, N. J., assignor to Esso Research and Engineering Company, a corporation of Delaware Application January 2, 1953, Serial No. 329,195

4 Claims. (Cl. 260—669)

This invention relates to a new synthetic all-hydrocarbon drying oil and to a process for preparing the said drying oil by copolymerizing a major proportion of a diolefin such as 1,3-butadiene, with a minor proportion of styrene in the presence of a hydrocarbon diluent, using an alkali metal, particularly sodium, as catalyst. The further presence of certain promoters and modifiers in the reaction mixture is also desirable to obtain a colorless product in the most efficient manner.

This application is a continuation-in-part of application Ser. No. 102,703, filed July 1, 1949, now U. S. Patent 2,652,342, and Serial No. 176,771, filed July 29, 1950, now U. S. Patent 2,762,851.

The copolymerization of butadiene with styrene in the presence of sodium has been studied experimentally for some years. However, emphasis has been placed on the preparation of solid rubbery products and little study has been made on the preparation of oily products having intrinsic viscosities below 0.5. The use of sodium to catalyze the copolymerization of 1,3-butadiene and styrene was explored in an article by C. S. Marvel, W. J. Bailey and G. E. Inskeep of the University of Illinois in the "Journal of Polymer Science," vol. 1, No. 4 (1946), pages 275–288. The influence of the purity of the monomers, the presence of diluents, and the amount of catalyst are studied. Most of the products made had intrinsic viscosities of 1 to 7, but a few were below 1 and as low as 0.23; these low ones were prepared from substantially pure (99.7%) butadiene, and pure styrene, in the presence of a hydrocarbon diluent in the ratio of up to four parts of diluent to one of monomers, and up to 2.1 parts of sodium sand. The authors also found that they were unable to get any sign of polymerization of an ordinary petroleum refinery butadiene (98%), even after three weeks at 30° C. (Marvel p. 278).

Rothrock (Patent No. 2,264,811) prepared viscous drying oils from petroleum $C_4$ cut containing butadiene, in the presence of solvents using 4–14% of sodium, at high temperature, but these products did not have as good properties as desired, and as necessary for commercial success. Also, the patent states: "Temperatures below 100° C. produce negligible quantities of drying polymers."

Crouch (Patent No. 2,543,440) discloses making a drying oil by polymerization of butadiene at 85–90° C. with 1–3% of sodium, in the presence of heptane.

Substantially pure butadiene of more than 99.5% purity is very expensive to prepare, but butadiene of 98 to 98.5% purity is available at petroleum refineries at a reasonable cost. It is, therefore, desirable to provide a process for the production of drying oils from such refinery butadiene. Butadiene made from alcohol has different impurities and also is more expensive.

The chief impurities found in commercial petroleum refinery butadiene are propane, propylene, propadiene, butane, butene-1, butene-2, 1,2-butadiene, ethyl acetylene, vinyl-acetylene, pentanes, pentenes, pentadienes, cyclopentadienes, and butadiene dimer. Some of these compounds are modifiers for the sodium catalyst and may also affect the course and extent of the polymerization, especially as to the butadiene monomer. The chief modifiers are butadiene-1,2, and vinylacetylene; the sum of these two materials in refinery butadiene ranges from 0.1 to 0.5 wt. percent and is usually from 0.10 to 0.20%. The major proportion of the unsaturated impurities present are mono-olefins, the amount being about 1.0–2.0%, usually about 1.2–1.7% by weight, but, on a percentage basis, they have a negligible modifying effect as compared to the diolefins and acetylenes. In order to successfully carry out a polymerization process in a reasonable time (less than 12 hours) using such a commercial butadiene containing the above impurities which act as catalyst modifiers, it is necessary to control the reaction very closely. The amount of pure 1,3-butadiene in commercial petroleum butadiene is about 98.0 to 98.5% by weight.

According to the invention, 75 to 85 parts of this commercial butadiene and 25 to 15 parts of styrene, are copolymerized either by batch or continuous process in the presence of finely divided metallic sodium. The polymerization is carried out in a reaction diluent at temperatures ranging from about 25° C. to 95° C., preferably temperatures between 45 and 85° C. when a batch process is used and at 60° to 95° C. preferably 70–95° C. when a continuous process is used. As a polymerization catalyst about 1.2 to 8 parts of finely divided sodium per 100 parts of monomers is used, preferably 1.2 to 3 parts when a batch process is employed, and 2 to 5 parts when a continuous process is employed.

The above choice of monomer is quite specific as halogen-containing monomers such as chloroprene or chlorinated styrene are not suited for polymerization in the presence of sodium. Similarly, most of the higher homologues of butadiene are not desirable for the purposes of the present invention since polymers of isoprene, dimethylbutadiene and higher diolefins tend to give films of poor quality. Only diolefins of the formula $$RCH=CH-CH=CH_2$$

can be used; where R is H (in butadiene), or $CH_3$ (in piperylene). The replacement of styrene by its ring alkylated homologues, such as para-methyl styrene, meta-methyl styrene, dimethyl styrene and the corresponding ethyl substituted homologues is the only variation of monomers permissible herein, however, styrene is the most practical from the economic standpoint. Alpha methyl styrene is unsuitable because it is too unreactive.

Materials used as diluents in the polymerization should be liquid at the polymerization temperature, that is, they should boil between 20 and 250° C., although more volatile materials boiling as low as −15° C. may be used also, providing that the polymerization pressure is increased correspondingly. Preferred diluents are essentially aliphatic hydrocarbons such as naphtha (boiling range about 90 to 120° C.) or straight run mineral spirits such as Varsol (boiling range about 150 to 200° C.), but butane, pentane, benzene, toluene, xylene, cyclohexane, butenes, pentenes or similar inert hydrocarbons are also usable, individually or in admixture with each other. In general, the aromatic solvents are not so desirable as the aliphatic ones because of the toxicity of the former. The hydrocarbon diluents are used in amounts ranging from 50 to 500, preferably 100 to 400 parts per 100 parts by wt. of monomers in batch polymerizations, and 50 to 300 in continuous polymerization.

Another important feature of the present invention involves an improvement in polymerization rate and product quality. In particular, it has now been discovered that this object can be accomplished to a varying degree by using a substantial amount of certain ethers as co-diluents or modifiers along with the hydrocarbon diluent described above. A particular outstanding promoter for the batch process has been found in dioxane-1,4, whose presence in the feed aids in the production of a colorless product of desirable viscosity and good drying properties, and promotes the reaction sufficiently to give 100% conversion at 50° C. in a period of about 5–10 hours. Similarly favorable results were also obtained with the diethyl ether of ethylene glycol, $H_5C_2OCH_2.CH_2OC_2H_5$, with diethyl ether $(C_2H_5)_2O$, and also with the diethyl ether of diethylene glycol, $$H_5C_2OCH_2.CH_2.O.CH_2.CH_2.OC_2H_5$$

In a batch process diethyl ether is useable, although the initial induction period tends to be somewhat long. The diethyl ether of ethylene glycol is not preferred, because with it a product having an undesirably high molecular weight is produced. However, diethyl ether is the preferred ether in a continuous process as the difficulty with the induction period is generally not present, it is less subject to undesirable side reactions with metallic sodium, and it is a more vigorous promoter. Other ethers useful to a still lesser extent are diethyl acetal, vinyl isobutyl ether, dihydropyrane and ethylal, all of which have a favorable effect on improving the color of the product.

In contrast to the preferred ethers named earlier herein, the four ethers just named have a moderate retarding effect on the polymerization rate. Finally, all ethers having an O—C—O— group in a ring structure, such as dioxane-1,3, dioxolane, paraldehyde and glycol ethylidene diacetal, inhibit the polymerization rate so excessively that their use is impractical. Dimethyl ether also does not serve the desired purpose, both as regards reaction rate and product quality.

The ether promoter is used in amounts ranging from about 1 to 400 parts, preferably 5 to 50 parts by weight per 100 parts of monomers. In selecting the ether co-diluent it is especially desirable in many cases to select an ether having a boiling point at least 10° C. below the lower limit of the boiling range of the hydrocarbon diluent, and thus, when using a mineral spirits having a boiling range of 150° C. to 200° C., ether co-diluents boiling between about 25 and 140° C. are preferred for the reason that their separation from the hydrocarbon diluent in the polymerized reaction mixture is greatly facilitated by virtue of the stated difference in boiling points. If the polymer is recovered in about 100% purity, the ether may boil in the range of the hydrocarbon diluent since both may be recycled together in making up the fresh feed to the reactor.

It is also highly advantageous to use about 10 to 50%, preferably 10 to 30 weight percent (based on sodium) of an alcohol in the polymerization recipe. Any substantially anhydrous mixture is satisfactory. Suitable alcohols include isopropanol, isobutanol, isopentanol, secondary butanol and tertiary butanol. The coarser the catalyst dispersion, the more essential it is to have a sufficient amount of alcohol promoter present.

The reaction time and induction period vary depending on the degree of catalyst dispersion, reaction temperature, purity of feed materials and sequence of monomer addition. For example, the initial induction period can be reduced substantially, and, as a very important feature, the formation of undesirable partially insoluble polymer fractions having a high styrene content can be avoided by introducing styrene monomer only after the polymerization of the butadiene feed has been initiated, e. g. adding styrene 10 to 60 minutes after the butadiene feed has been brought up to the reaction temperature. If the styrene is not withheld, frequently some polymers or copolymers are formed which may have even over 50% combined styrene (from a feed containing 20% styrene) and such undesirable polymers then tend to precipitate out of solution during stripping of the solvent.

The usual reaction time ranges from about 4–5 hours at 50° C. or 8–9 hours at 30° C., with a catalyst of 50 micron diameter to about 15 minutes at 95° C. with a finer catalyst averaging about 10–20 microns. It is preferred to operate with a catalyst particle size of about 1 to 50, or 10 to 50 microns, such as a mixture ranging from 20 to 40 microns. Such a catalyst can be prepared by dispersing the molten alkali metal in a hydrocarbon such as Varsol by means of a homogenizer such as an Eppenbach Homo-Mixer and cooling the resulting dispersion below the melting point of sodium to prevent coalescence of the dispersed sodium particles.

The catalyst is usually fed to the reactor as a slurry of metal particles dispersed in 2 to 200 parts by weight of a hydrocarbon liquid, which may or may not be the same as the reaction diluent. Agitation of the reaction mixture during synthesis increases the efficiency of the catalyst. Conversions of 50% to 100% on monomers can be accomplished fairly readily in a batch-type operation. 100% conversion is preferred and is the usual practice. It is more difficult to reach 100% conversion in a continuous operation, and it should be observed that catalyst requirements are generally greater for continuous operation than for a batch operation having the same conversion level.

Destruction of catalyst at the end of the reaction is effectively accomplished by adding to the reaction mixture a moderate excess of anhydrous $C_1$ to $C_5$ fatty acid which is soluble in the hydrocarbon mixture, e. g. formic, acetic or pentanoic. After destruction of the catalyst the crude polymerization product containing the salts, excess acid and other impurities is neutralized with ammonia, and the neutralized product is finally filtered with a filter aid such as silica gel, clay, charcoal or its equivalent. Other ways of destroying the catalyst may be used, such as by adding alcohol, or inorganic acids.

Since the resulting polymer solution is usually too dilute for most practical use as a varnish or enamel base, it is advantageous to distill off some of the volatile hydrocarbon solvent until a product containing not less than 50% to 70% non-volatile matter is obtained, the non-volatile matter being the polymeric drying oil. Where even more highly concentrated products are desired it is possible to raise the concentration of the polymeric drying oil to as much as 99% or greater non-volatile matter by still more extensive distillation or stripping; the use of a stripping gas such as methane is advantageous where highly concentrated drying oils are desired. Alternatively, one may use a low boiling diluent such as butane, a pentane, or a low boiling naphtha in the synthesis step and thus simplify the eventual removal of the diluent from the polymeric product.

The reaction is preferably carried out in an agitated closed reactor if a batch process is employed. In continuous process it is necessary to carry out the process as described in Serial No. 293,772, filed June 16, 1952, now U. S. Patent 2,728,801, if quantitative conversions are desired. The resulting product, being usually a solution of polymeric drying oil in a suitable hydrocarbon solvent such as solvent naphtha or mineral spirits is, depending on the amount and type of ether used, a clear, colorless to light yellow varnish composition having at 50% N. V. M. (non-volatile matter) in Varsol, a viscosity of 0.15 to 20 poises, and preferably 0.4 to 2.2 poises when batch operation is used. The corresponding intrinsic viscosities for the drying oil polymer per se, are about 0.03 to 0.45 and preferably 0.08 to 0.20 in batch operation, and 0.03 to 0.18 in continuous operation.

It is one of the main features of the present invention that it is possible to prepare oils having intrinsic viscosities lower than those which have hitherto reported in the literature. As pointed out above, Marvel (loc. cit) prepared a product having an intrinsic viscosity of 0.23. It has now been found that oils having intrinsic viscosities below about 0.20 yield clear varnish films which have superior adhesive properties of a totally different order of magnitude from those obtained with films prepared from oils having intrinsic viscosities greater than 0.20. Furthermore such oils have greater thermal stability than those having intrinsic viscosities above about 0.20.

Product development studies have shown that the upper viscosity limit is 2 poises at 50% non-volatile content in Varsol to avoid depreciation of such properties as adhesion, stability and certain desirable working qualities.

In order to have good pigment wetting characteristics for glossy coatings, it is also essential to form an adduct with a polar constituent such as maleic anhydride. This is generally accomplished by heating. The viscosity tends to rise even more rapidly as the adduct is formed, usually during the heat bodying reaction. Thus it is important that the synthesized intrinsic viscosity be such that adduct formation and head bodying can be carried out with good control and without exceeding the desirable viscosity limits.

Oils having viscosities in this range are prepared in general in accordance with the above description. However, the amount of diluent should lie between 150 and 500 parts per 100 parts of monomers. The amount of sodium should be over 1.5 and may go as high as 5 if a continuous process is used. The alcohol modifier should not be less than 5% and may go up to 50% by weight of sodium. The amount of ether may vary between 5 and 400 parts. The temperature should be maintained between 40 and 85° C. for a batch process.

If desired, the product viscosity can be readily increased within or above these limits by heat-bodying the oil in the absence of air at temperatures between 200 and 300° C., e. g. at 220 to 260° C. The clear varnish composition can be brushed, poured or sprayed and gives good clear films on drying in air or baking, especially when conventional driers such as the naphthenates or octoates of cobalt, lead or manganese are added thereto. Excellent films can be prepared by baking even in the absence of driers.

Furthermore, when the drying oil compositions of the present invention are intended for use in pigmented enamels, their gloss and wetting power can be further improved by reacting them with a small amount of a polar compound such as maleic anhydride, acrylonitrile, thioglycolic acid or other equivalent materials described in copending patent applications Serial No. 102,703, filed July 1, 1949, now U. S. Patent 2,652,342, and Serial No. 106,487, filed July 23, 1949, now U. S. Patent 2,683,162.

Lead driers can be used also, but, unlike the case of natural drying oil varnishes, are not necessary here. This, of course, is a decided advantage in some cases in view of the toxicity of the lead driers.

Another important advantage of the invention is that the present drying oils can be used as a varnish without the addition of any extraneous polymer or resin thereto. This further distinguishes the products of the invention from prior art drying oils, notably the natural oils such as linseed, which require the addition of rosin, ester gum or a phenolic resin thereto when a varnish is desired.

The invention will be better understood from the subsequent illustrative examples. In these examples, as in all other portions of this specification, when quantities are stated in "parts," it will be understood that reference is had thereby to "parts by weight," unless expressly indicated otherwise.

EXAMPLE 1

To illustrate the effect of styrene concentration on product quality three runs were made which were identical except that the styrene concentration was varied. The respective reaction mixtures had the following composition.

|  | Run A, parts | Run B, parts | Run C, parts |
| --- | --- | --- | --- |
| Butadiene-1,3 | 90 | 80 | 70 |
| Styrene | 10 | 20 | 30 |
| Varsol | 200 | 200 | 200 |
| Dioxane-1,4 | 28 | 28 | 28 |

Each mixture of reactants was placed in a two-liter stainless steel bomb provided with a mechanical agitator, and 1.5 parts of finely dispersed sodium in the form of a dispersion in 100 parts of Varsol (sodium particle size 30–50 microns) were added together with 0.3 part of isopropyl alcohol. After closing, the reactors were heated to 50° C. and the reaction mixture agitated at that temperature for 20 hours. This particular reaction period was chosen purely as a matter of convenience. Judging from other similar runs not shown here, 100% conversion was reached in all of the above runs long before the end of the 20 hours, the reaction rate in run C being the fastest and the reaction rate in run A being the slowest.

After cooling to room temperature, 9 parts of glacial acetic acid were added to each reactor and allowed to react until the sodium was all consumed, excess acetic acid was neutralized by bubbling ammonia gas through the reaction mixture, and the resulting sodium and ammonium salts were separated therefrom by filtration. Finally the polymer contained in the filtered hydrocarbon solution was concentrated by vacuum distillation at 70 to 100° C. until a solution having a polymeric non-volatile matter content of 50% was obtained.

In all cases approximately 100% conversion of monomers into desired polymer was obtained, but the resulting products differed in terms of viscosity. Determined at 50% concentration of non-volatile matter in hydrocarbon, the product viscosities were as follows.

|  | Poise | I. V. |
| --- | --- | --- |
| Run A | 1.4 | 0.17 |
| Run B | 2.4 | 0.21 |
| Run C | 6.5 | 0.30 |

The unsaturation of the copolymers was determined and was found to be in the range of 280 to 325 c. g. iodine per gram (on a solvent-free basis), which corresponds to about 75 to 90% of the theoretical value calculated from the total amount of combined butadiene present. Apparently some of the butadiene unsaturation is consumed by cyclization. Of the total unsaturation, about 60 to 70% was found to exist in the form of side vinyl groups as determined by the infrared method, values of up to about 60% having been found for the same polymers when the oxidation method (to formic acid) was used. The effect of varying styrene content on the extent and type of unsaturation appears to be slight, but the proportion of side vinyl groups in the polymer seems somewhat affected by the reaction temperature. In any event, the high proportion of side vinyl groups clearly distinguishes the drying oils of the invention from related polymers of the prior art, and undoubtedly is one of the foremost reasons, along with the effect of the critical styrene concentration, for the surprising superiority of the new oils as regards drying rate, chemical resistance, and aging characteristics. The copolymers are characterized not only by an excellent chemical and color stability, but also by a remarkably fast drying rate. Heretofore, it has been found impossible to combine both of these important characteristics in an all-hydrocarbon drying oil in a measure comparable to the present results. For example, it is known that similar copolymers prepared by emulsion polymerization dry poorly and generally require high-temperature baking where a good film is desired.

Table I.—Degree of tack [a]

| Drying Time—Hours | 1 | 2 | 4 | 6 | 24 |
| --- | --- | --- | --- | --- | --- |
| Run A (10% Styrene) | 8 | 8 | 8 | 6 | 0 |
| Run B (20% Styrene) | 8 | 8 | 6 | 5 | 0 |
| Run C (30% Styrene) | 8 | 8 | 6 | 4 | 0 |

[a] Rating: 9—wet, 8—very sticky, 7—film just clings to finger, 6—set to touch, 3—decided tack, but dust free, 0—dry, tack free.

The chemical resistance of the several films was also determined after a drying time in air of one and two weeks respectively. The results obtained are summarized in Table II below.

Table II

| Drying Time | 1 week | | | | 2 Weeks | | | |
|---|---|---|---|---|---|---|---|---|
| Resistance | W | G | S | C | W | G | S | C |
| Run A | 3 | 0 | 4 | 3 | 4 | 0 | 2 | 3 |
| Run B | 2 | 0 | 0 | 2 | 0 | 0 | 1 | 1 |
| Run C | 4 | 0 | 0 | 0 | 4 | 0 | 0 | 1 |

Code: W—water resistance. G—grease resistance. S—soap. C—caustic.
Scale: 0—unaffected. 9—failure.

These data indicate that an increase in the styrene content of the polymer improves the resistance of the resulting film coatings to soap and caustic. However, an increase in styrene content in excess of 25% appears undesirable as the water resistance of the resulting films reaches a surprising optimum value at a styrene content of about 20%. Also the viscosity of the polymer tends to increase rather rapidly as its styrene content is increased beyond about 25%, and eventually the drying rate also begins to suffer as the unsaturation of the polymer becomes excessively reduced. Above the optimum value, increasing styrene concentrations furthermore increases the brittleness of the films. Thus it is apparent that for the purposes of the present invention the styrene content must be kept between about 15 and 25%.

EXAMPLE 2

The effect of ether concentration on product quality is also very distinct as illustrated by the following batch runs wherein the concentration of ether, namely dioxane-1,4, was varied between 0 and 300 based on monomers. Otherwise, the polymerization recipe and procedure used in these runs were identical with run B employing 20% styrene in the feed as described in Example 1. The data obtained are summarized below in Tables III and IV.

Table III

| Run | D | E | F | G | H |
|---|---|---|---|---|---|
| Percent Dioxane | 0 | 14 | 28 | 42 | 300 |
| Vis. at 50% N. V. M | 0.5 | 2.2 | 2.4 | 2.8 | 2.5 |
| Color | Yellow | | Colorless | | |

DEGREE OF TACK [a]

| Drying Rate, Hours: | | | | | |
|---|---|---|---|---|---|
| 1 | 9 | 8 | 8 | 8 | 8 |
| 2 | 9 | 8 | 8 | 8 | 7 |
| 4 | 9 | 7 | 6 | 8 | 6 |
| 6 | 9 | 5 | 5 | 8 | 3 |
| 24 | 9 | 0 | 0 | 0 | 0 |

[a] Scale of rating same as in Example 1, Table 1, above.

Table IV

| Run | D | E | F | G | H |
|---|---|---|---|---|---|
| Chemical Resistance [b] | | | | | |
| Air-Dried (1 week): | | | | | |
| W | | 1 | 2 | 3 | |
| G | | 0 | 0 | 0 | |
| S | | 0 | 0 | 1 | |
| C | | 0 | 2 | 0 | |
| Air-Dried (2 weeks): | | | | | |
| W | | 2 | 0 | 2 | 0 |
| G | | 0 | 0 | 0 | 0 |
| S | | 1 | 1 | 1 | 2 |
| C | | 2 | 1 | 1 | 0 |

[b] Scale of rating same as in Example 1, Table II.

These data show that in the absence of any ether, the polymer obtained is yellow, and has an excessively slow drying rate. The increase in product viscosity accompanying the increase in dioxane concentration is contrary to expectations, as normally promotion of reaction rate is attributed to an increase in the number of initiation centers, which in turn should result in a decrease in intrinsic viscosity of the polymer produced. The results obtained show that the situation here is actually the reverse.

EXAMPLE 3

The effect of catalyst concentration on product quality has also been determined. To this end a series of three batch runs was made wherein the sodium concentration was varied between 1.5 and 2.5% based on monomers. Otherwise the polymerization recipe and procedure used in these runs were identical with run B described in Example 1. The data obtained are summarized in Table V.

Table V

| Run | Percent Na | Vis. At 50% N. V. M., Poise | I. V. | Drying Rate,[a] Hours | | | | | Chemical Resistance [a] | | | | | | | |
|---|---|---|---|---|---|---|---|---|---|---|---|---|---|---|---|---|
| | | | | | | | | | Air-Dried 2 weeks | | | | Air-Dried 4 weeks | | | |
| | | | | 1 | 2 | 4 | 6 | 24 | W | G | S | C | W | G | S | C |
| H | 1.5 | 2.4 | .21 | 8 | 8 | 6 | 3 | 0 | 2 | 0 | 0 | 2 | 0 | 0 | 1 | 1 |
| I | 2.0 | 1.1 | .15 | 8 | 8 | 7 | 4 | 0 | 0 | 0 | 1 | 0 | 0 | 0 | 1 | 1 |
| J | 3.0 | 0.9 | .14 | 8 | 8 | 8 | 7 | 0 | 1 | 0 | 0 | 1 | 0 | 1 | 1 | 1 |
| K | 4.0 | 0.8 | .13 | 8 | 8 | 8 | 7 | 0 | 0 | 0 | 2 | 0 | 3 | 0 | 0 | 0 |

[a] Scale of rating same as in Example 1.

From these data it is seen that the catalyst concentration has little effect on the chemical resistance of the eventual film coatings. However, increasing catalyst concentrations tend to lower the molecular weight of the polymeric product and consequently also its drying rate in the absence of any heat bodying. Accordingly, depending on specific conditions employed, the catalyst concentration should be kept between about 1.2 and 8%, and preferably between 1.5 and 5% based on monomers, depending to some extent on whether continuous or batch operation is used.

EXAMPLE 4

A series of copolymer oils synthesized to different viscosities were prepared in accordance with run B of Example 1, and tested for their adhesivity and compared with the product obtained in accordance with the Rothrock Patent, 2,268,811, and with a commercial alkyd varnish. The following results were obtained.

Table VI.—Adherometer adhesion for various synthesis instrinsic viscosities of copolymer oil [1]

| Run | Viscosity, Poise [2] | Intrinsic Visc. | A × 10⁵ (Adhesion) [3] (Per 4 mm. wide) |
|---|---|---|---|
| 1 | 0.65 | 0.11 | 3.50 × 10⁵ dynes. |
| 2 | 1.4 | 0.17 | 3.44 × 10⁵ dynes. |
| 3 | 1.0 | 0.14 | 3.19 × 10⁵ dynes. |
| 4 | 2.2 | 0.20 | 1.99 × 10⁵ dynes. |
| 5 | 3.4 | 0.24 | 1.72 × 10⁵ dynes. |
| 6 | 5.4 | 0.28 | 1.66 × 10⁵ dynes. |
| 7 | 12.0 | 0.37 | 1.58 × 10⁵ dynes. |
| 8 | 1.4 | (4) | 1.06 × 10⁵ dynes. |
| 9 | 8.0 | (5) | 1.30 × 10⁵ dynes. |

[1] All films were baked 30 minutes at 300° F. on Can Maker's Quality steel #7 finish. No driers were used.
[2] Viscosity in poise is at 50% non-volatile content in Varsol measured by means of the Gardner Bubble Viscometer.
[3] Adhesion is the force required to overcome the interfacial bond to the metal of a strip of film 4 mm. wide. Detailed discussion of the operation of the Adherometer is recorded in "Measure of Adherence of Organic Coatings to Metal" by Henry Green and Theresa Lamattina, Division of Paint, Varnish and Plastic Chemistry papers. A. C. S. Convention, Chicago, Ill., April 1948.
[4] Prepared according to Rothrock U. S. 2,268,811.
[5] A commercial alkyd varnish.

The above data clearly show that the oils having an intrinsic viscosity below about 0.20 exhibit remarkably strong adhesion characteristics. Figure 1 diagrammatically illustrates the sudden change which takes place in these properties at about 0.20 intrinsic viscosity. It follows from these data that these very low viscosity oils, which are actually new to the art, are of much greater utility as coating and film-forming materials than any oils which have been previously prepared in the prior art.

EXAMPLE 5

A series of copolymer oils prepared according to the recipe of run B of Example 1 were reacted with various amounts of maleic anhydride at 175° C. for two hours in accordance with the process disclosed and claimed in Ser. No. 102,703, filed July 1, 1949, now U. S. Patent 2,652,342, with the following results:

Table VII.—Enamel evaluation

| Enamel (Run No.) | Percent Maleic Anhydride | Oil Viscosity (Poise) | Paste Factor, g. oil per 100 g. Pigment | Gloss Poured Film | Gloss Brushed Film | Leveling (Absence of Brush Marks) | Drying Rate Set To Touch (Hours) | Drying Rate Tack Free (Hours) |
|---|---|---|---|---|---|---|---|---|
| A | None | 0.9 | 121.5 | Flat | Egg Shell | Poor | 4-6 | <24 |
| B | None | 1.2 | 122.5 | Excellent | Excellent | Excellent | 4-6 | <24 |
| C | None | 0.5 | 142.0 | Flat, Seedy | Fair | Poor | 4-6 | >24<48 |
| D | None | 0.8 | 154.7 | Flat | do | do | 4-6 | <24 |
| E | None | 7.0 | 172 | Egg Shell | Excellent | Excellent | 4-6 | >24 |
| F | None | 1.0 | 111.0 | Fair, Pebbly | Fair | Poor | 4 | <24 |
| N | [b] 0.02 | 1.0 | 86.0 | Excellent | Excellent | Excellent | 6 | <24 |
| M | [b] 0.1 | 1.0 | 70.0 | do | do | do | 2-4 | <24 |
| P | [b] 0.25 | 1.0 | 41.0 | do | do | do | 6 | <24 |
| O | [b] 1.0 | 1.0 | 37.2 | do | do | do | 6 | <24 |
| Q | [b] 2 | 1.0 | 36.5 | do | do | do | 24 | >24 |
| R | [a] 0.25 | 8.8 | 67 | do | do | do | [d] 6 | [d] <24 |
| S | [a] 1.5 | 11 | 47 | do | do | do | [d] 6 | [d] <24 |
| T | [a] 3.0 | | | | | | | |
| U | [c] None | 1.0 | 94.3 | Excellent | Excellent | Excellent | 4 | 24 |

[a] Anhydride added to monomer feed.
[b] Anhydride reacted with finished drying oil product.
[c] Heat treatment of finished drying oil for 2 hrs. at 145° C.
[d] After aging.

The foregoing data clearly show the desirability of reacting the copolymer oil with maleic anhydride to improve the pigment-wetting properties.

EXAMPLE 6

The low viscosity oils are also much more heat stable than higher viscosity oils. A plurality of oils of different viscosity and prepared according to run B, Example 1 using ethyl ether as the viscosity regulator were each blown with air at 100° C. in the presence of 0.4% of lead drier and the time taken to raise the viscosity of the oil to 50 poises at 50% N. V. M. (57 I. V.) was recorded. These same oils were also heated at 250° C. with 0.5% of maleic anhydride and the time in minutes to incipient gel formation was recorded. The data are presented in the following table and graphically shown in Figure 2.

Table VIII

| Original Vis. Poise @ 50% N. V. | I. V. | Air Blowing Hrs. to body to 50 poises @ 100° C., 0.4% Pb drier | Gel time of C-oil treated with 0.5% maleic anhydride @ 250° C., Min. |
|---|---|---|---|
| 0.65 | 0.115 | 11.5 | 1,385 |
| 1.5 | 0.175 | | 575 |
| 2.2 | 0.20 | 7.0 | 375 |
| 2.4 | 0.21 | | 360 |
| 3.6 | 0.245 | 6.0 | 175 |
| 4.6 | 0.27 | 5.0 | 170 |
| 6.0 | 0.30 | | 155 |

The above data clearly show that oils having an intrinsic viscosity below 0.20 are remarkably stable to heat in the presence of oxygen and are more resistant to gel formation when treated with maleic anhydride. These properties become important when it is desirable to prepare the oils and store them prior to use. Furthermore, since it is often desirable to react the oil with maleic anhydride to increase pigment wetting properties as shown in Table VIII, the use of these low viscosity oils prevents gel formation on heating.

EXAMPLE 7

Oily copolymers made according to run B of Example 1, and synthesized to different intrinsic viscosities were each heat-bodied for one hour, one and a half hours and two hours at 160° C. to show the effect of the original viscosity on the rate of bodying. The data are reported in the following table and in Figures 3, 4, and 5.

| Intrinsic Viscosity (As synthesized) | Viscosity Increase (Poise @ 50% N. V. M.) Heating @ 160° C., For Specified Time | | |
|---|---|---|---|
| | 1 Hr. | 1.5 Hr. | 2 Hr. |
| 0.14 | 0.1 | 0.1 | 0.1 |
| 0.16 | 0.1 | 0.1 | 0.1 |
| 0.20 | 0.2 | 0.5 | 0.75 |
| 0.24 | 0.7 | 0.8 | 0.80 |
| 0.27 | 3.2 | 7.1 | 12.9 |

These data confirm those obtained in Example 6 and show that the lower viscosity oils (below 0.2 I. V.) are much more heat stable than the high viscosity oils.

Thus the present invention affords a means for obtaining drying oils which have intrinsic viscosities below 0.20 and which are lower in viscosity than any which have hitherto been prepared and which are characterized by unusual stability to heat, high adhesivity and low gel-forming tendency when reacted with polar compounds, such as maleic anhydride.

EXAMPLE 8

A series of copolymer oils were synthesized to viscosities ranging from 0.65 to 6 poises at 50% N. V. M. (0.115 to 0.335 I. V.). They were all then thermally bodied to a 10 poise level (0.35 I. V.) baked at 250° C. with 0.01% Mn drier and evaluated for resistance to hot caustic. The following results were obtained:

| Original Viscosity Poise (50% N. V. M.) | I. V. | Resistance to Hot Caustic after baking at 250° C., with 0.01% Mn drier for— | |
|---|---|---|---|
| | | 30′ | 60′ |
| 0.65 | .115 | 4 | 3 |
| 1.3 | .16 | 4 | 2 |
| 2.3 | .21 | 5 | 3 |
| 3.6 | .245 | 7 | 7 |
| 4.6 | .27 | 6 | 5 |
| 6.0 | .30 | 7 | 7 |
| 9.0 | .335 | 7 | 7 |

The above data show that copolymer oils having a viscosity of 0.21 I. V. (2.3 poises) and below give baked films with better resistance to hot caustic than do oils having higher viscosities.

The nature of the present invention having been thus fully set forth and specific examples of the same given, what is claimed as new and useful and described to be secured by Letters Patent is:

1. A new composition of matter comprising a copolymer of about 75 to 85 parts of combined butadiene-1,3 and about 25 to 15 parts of a combined styrene, chosen from the group consisting of styrene, para methyl styrene, meta methyl styrene, dimethyl styrene, para ethyl styrene, meta ethyl styrene, and diethyl styrene, said copolymer having a viscosity of 0.15 to 2.2 poises at 50% non-volatile matter as measured in straight-run mineral spirits boiling 150° to 200° C.

2. A new drying oil composition comprising a hydrocarbon solvent and, dissolved therein, a copolymer of 75 to 85 parts of combined butadiene-1,3 and 25 to 15 parts of combined styrene, said copolymer being water-white and having a viscosity of about 0.15 to 2.2 poises at 50% non-volatile matter as measured in straight-run mineral spirits boiling 150° to 200° C. and being characterized by thermal stability, strong adhesivity, low gel-forming tendency when reacted with a polar compound and which forms films resistant to hot caustic.

3. A drying oil consisting of 80% of combined butadiene-1,3, and 20% combined styrene, said copolymer having a viscosity not above about 2.2 poises at 50% non-volatile matter as measured in straight-run mineral spirits boiling 150° to 200° C. and being characterized by thermal stability, strong adhesivity, low gel-forming tendency when reacted with maleic anhydride and which forms films resistant to hot caustic.

4. Product according to claim 1 in which the said polymer has been subsequently blown with air at an elevated temperature in the presence of a drier.

References Cited in the file of this patent

UNITED STATES PATENTS

| | | |
|---|---|---|
| 2,672,425 | Gleason et al. | Mar. 16, 1954 |
| 2,753,385 | Gleason | July 3, 1956 |
| 2,762,851 | Gleason | Sept. 11, 1956 |
| 2,767,229 | Gleason | Oct. 16, 1956 |
| 2,768,984 | Mertzweiller et al. | Oct. 30, 1956 |

OTHER REFERENCES

Marvel et al.: "Jour. of Polymer Science," vol. 1, pp. 275–288 (April 1946, 14 pp.) (p. 277 only is relied on).

Cragg: "Jour. of Colloid Science," vol. 1, pp. 261–269 (9 pp., May 1946).